US012565944B1

(12) United States Patent
Fields

(10) Patent No.: US 12,565,944 B1
(45) Date of Patent: Mar. 3, 2026

(54) CONNECTOR ASSEMBLIES AND PROCESSES FOR USING SAME

(71) Applicant: KOIL ENERGY SOLUTIONS, INC., Houston, TX (US)

(72) Inventor: Michael Shane Fields, Conroe, TX (US)

(73) Assignee: KOIL ENERGY SOLUTIONS, INC., Houston, TX (US)

( * ) Notice: Subject to any disclaimer, the term of this patent is extended or adjusted under 35 U.S.C. 154(b) by 0 days.

(21) Appl. No.: 19/309,664

(22) Filed: Aug. 26, 2025

Related U.S. Application Data

(60) Provisional application No. 63/761,906, filed on Feb. 22, 2025.

(51) Int. Cl.
| | |
|---|---|
| *F16L 1/12* | (2006.01) |
| *E21B 43/01* | (2006.01) |
| *F16L 37/084* | (2006.01) |
| *E21B 17/01* | (2006.01) |

(52) U.S. Cl.
CPC .......... F16L 1/123 (2013.01); E21B 43/0107 (2013.01); F16L 37/0841 (2013.01); E21B 17/017 (2013.01)

(58) Field of Classification Search
CPC ....... F16L 1/123; F16L 37/0841; E21B 17/01; E21B 17/02; E21B 17/017; E21B 43/01; E21B 43/0107; E21B 43/013
See application file for complete search history.

(56) References Cited

U.S. PATENT DOCUMENTS

| | | | | |
|---|---|---|---|---|
| 5,279,369 | A * | 1/1994 | Brammer | .............. E21B 33/038 166/368 |
| 7,967,070 | B2 | 6/2011 | Reddy | |
| 8,573,305 | B2 | 11/2013 | Reddy | |
| 9,482,061 | B2 * | 11/2016 | Latimer | ................ E21B 17/085 |
| 9,732,595 | B2 * | 8/2017 | Wright | ................... E21B 17/02 |
| 11,613,934 | B2 * | 3/2023 | Pinho Dos Reis | ... E21B 17/085 166/367 |
| 2021/0348449 | A1 * | 11/2021 | Pinho Dos Reis | . E21B 43/0107 |

FOREIGN PATENT DOCUMENTS

| | | | | |
|---|---|---|---|---|
| GB | 2625269 A | 6/2024 | | |
| WO | WO-2016038396 A1 * | 3/2016 | .............. F16L 37/60 |

* cited by examiner

*Primary Examiner* — Frederick L Lagman

(74) *Attorney, Agent, or Firm* — Edmonds & Cmaidalka, P.C.

(57) ABSTRACT

A connector assembly that can include a first tubular member that defines a plurality of apertures through a sidewall thereof, a second tubular member that defines one or more grooves on an outer surface thereof and a plurality of apertures through a sidewall thereof, a plurality of first bolts, a plurality of second bolts, a release ring, and a plurality of release keys. The second member can be disposed within a bore defined by the first member at a first position and a second position relative to the first member. When the first bolts are in a first locked position and the second member is at the first position, a first end of each first bolt can be disposed within a corresponding one of the one or more grooves, and when the second member is in the second position, the second bolts can be in the unlatched position.

20 Claims, 6 Drawing Sheets

CONNECTOR ASSEMBLIES AND PROCESSES FOR USING SAME

CROSS-REFERENCE TO RELATED APPLICATION

This application claims priority to U.S. Provisional Patent Application No. 63/761,906, filed on Feb. 22, 2025, which is incorporated by reference herein.

FIELD

Embodiments described generally relate to connector assemblies and processes for using same. More particularly, such embodiments relate to connector assemblies for connecting a support apparatus to an offshore structure through which a subsea conduit can be disposed and processes for using same.

BACKGROUND

In the offshore energy industry, including the deepwater offshore oil and gas industry and the floating wind industry, it is sometimes desirable or necessary to connect a support apparatus, i.e., a conduit protection apparatus such as a bend restrictor or a bend limiter, that can be disposed about a conduit to an offshore structure while also connecting the conduit to the offshore structure. Connection of the support apparatus to the offshore structure is generally accomplished via a connector assembly.

Typically, divers or remotely operated vehicles attach the support apparatus to the offshore structure via the connector assembly, which can be time consuming, tedious, and expensive. It can also be difficult to ensure that connection of the support apparatus to the offshore structure via the connector assembly was made correctly.

There is a need, therefore, for improved connector assemblies for connecting a support apparatus to an offshore structure and process for using the same.

SUMMARY

Connector assemblies and process for using same are provided. In some embodiments, the connector assembly can include a first tubular member, a second tubular member, a plurality of first bolts, a plurality of second bolts, a release ring, and a plurality of release keys. The first tubular member can define a bore therethrough from a first end to a second end thereof. A sidewall of the first tubular member can define a plurality of apertures therethrough. The second tubular member can define a bore therethrough from a first end to a second end thereof. The second end of the second tubular member can be configured to be attached to a conduit protection apparatus. A sidewall of the second tubular member can define a plurality of apertures therethrough. The second tubular member can define one or more first grooves about an outer surface thereof. Each first bolt in the plurality of first bolts can be at least partially disposed through a corresponding one of the plurality of apertures defined by the sidewall of the first tubular member and can be movable between an unlocked position and a first locked position. Each second bolt in the plurality of second bolts can be at least partially disposed through a corresponding one of the plurality apertures defined by the sidewall of the second tubular member and can be movable between an unlatched position and a latched position. The release ring can be disposed about an exterior surface of the second tubular member and can include a first end and a second end. Each release key in the plurality of release keys can be configured to engage with the release ring and with a corresponding second bolt of the plurality of second bolts. The second tubular member can be configured to be at least partially positioned within a bore defined by the first tubular member and move between a first position and a second position relative to the first tubular member. When the second tubular member is in the first position or the second position and the plurality of first bolts is in the first locked position, a first end of each first bolt in the plurality of first bolts can be positioned within a corresponding one of the one or more first grooves defined by the second tubular member. When the second tubular member is in the second position, the plurality of second bolts can be in the unlatched position. When the second tubular member is in the first position or the second position, the first end of the release ring can be configured to abut against the second end of the first tubular member.

In some embodiments, a process for connecting a second tubular member to a first tubular member of a connector assembly can include positioning the second tubular member at least partially within a bore defined by the first tubular member at a first position. The first tubular member can define a bore therethrough from a first end to a second end thereof. A sidewall of the first tubular member can define a plurality of apertures therethrough. A first end of the first tubular member can be configured to be attached to an offshore structure. The second tubular member can define one or more first grooves about an outer surface thereof. A sidewall of the second tubular member can define a plurality of apertures therethrough. A second end of the second tubular member can be configured to be attached to a conduit protection apparatus. The connector assembly can further include a plurality of first bolts, a plurality of second bolds, a release ring, and a plurality of release keys. Each first bolt in the plurality of first bolts can be at least partially disposed through a corresponding one of the plurality of apertures defined by the sidewall of the first tubular member and can be movable between an unlocked position and a first locked position. Each second bolt in the plurality of second bolts can be at least partially disposed through a corresponding one of the plurality apertures defined by the sidewall of the second tubular member and can be movable between an unlatched position and a latched position. The release ring can be disposed about an exterior surface of the second tubular member. The release ring can include a first end and a second end. The first end of the release ring can be configured to abut against the second end of the first tubular member. Each release key in the plurality of release keys can be configured to engage with the release ring and with a corresponding second bolt in the plurality of second bolts. The process can also include positioning the plurality of first bolts in the first locked position such that a first end of each first bolt can be disposed within a corresponding one of the one or more first grooves defined by the second tubular member.

In some embodiments, a connector assembly can include a first tubular member, a second tubular member, a plurality of first bolts, a plurality of second bolts, a release ring, a plurality of release keys, a plurality of first bolt actuators, and a plurality of second bolt actuators. The first tubular member can include a first end configured to be attached to an offshore structure and a second end that can define a frusto-conical interior surface. A sidewall of the first tubular member can define a plurality of apertures therethrough. The second tubular member can include a first end that can define a frusto-conical exterior surface and a second end that can be configured to be attached to a conduit protection apparatus. The second tubular member can define a first circumferential groove and a second circumferential groove about an outer surface thereof. A sidewall of the second tubular member can define a plurality of radial apertures therethrough. The second circumferential groove can be located between the first circumferential groove and the first end of the second tubular member. Each first bolt in the plurality of first bolts can be at least partially disposed through a corresponding one of the plurality of apertures defined by the sidewall of the first tubular member and can be movable between an unlocked position, a first locked position, and a second locked position. Each second bolt in the plurality of second bolts can be at least partially disposed through a corresponding one of the plurality of apertures defined by the sidewall of the second tubular member and can be movable between an unlatched position and a latched position. The release ring can be disposed about an exterior surface of the second tubular member. The release ring can include a first end configured to abut against the second end of the first tubular member and a second end. Each release key in the plurality of release keys can be configured to engage with the release ring and with a corresponding second bolt. The second tubular member can be configured to be at least partially positioned within a bore defined by the first tubular member at a first position, at a second position, and at a third position relative to the first tubular member. When the second tubular member is in the first position or the second position and the plurality of first bolts is in the first locked position, a first end of each first bolt can be disposed within the first circumferential groove defined by the second tubular member. When the second tubular member is in the second position, the plurality of second bolts can be in the unlatched position. When the second tubular member is in the third position and the plurality of first bolts is in the second locked position, the first end of each first bolt can be disposed within the second circumferential groove defined by the second tubular member. The second tubular member can be movable between the first position and the second position while the first end of each first bolt remains disposed within the first circumferential groove defined by the second tubular member. When the second tubular member moves between the first position, the second position, and the third position, the plurality of first bolts can move between the first locked position and the second locked position without moving to the unlocked position. Each first bolt actuator in the plurality of first bolt actuators can be configured to exert a radially inward force on a corresponding first bolt to push the corresponding first bolt toward a central axis of the connector assembly. Each second bolt actuator in the plurality of second bolt actuators can be configured to exert a radially inward force on a corresponding second bolt to push the corresponding second bolt toward the central axis of the connector assembly.

BRIEF DESCRIPTION OF THE DRAWINGS

The various aspects and advantages of the preferred embodiment of the present invention will become apparent to those skilled in the art upon an understanding of the following detailed description of the invention, read in light of the accompanying drawings which are made a part of this specification.

DETAILED DESCRIPTION

Figure 1:
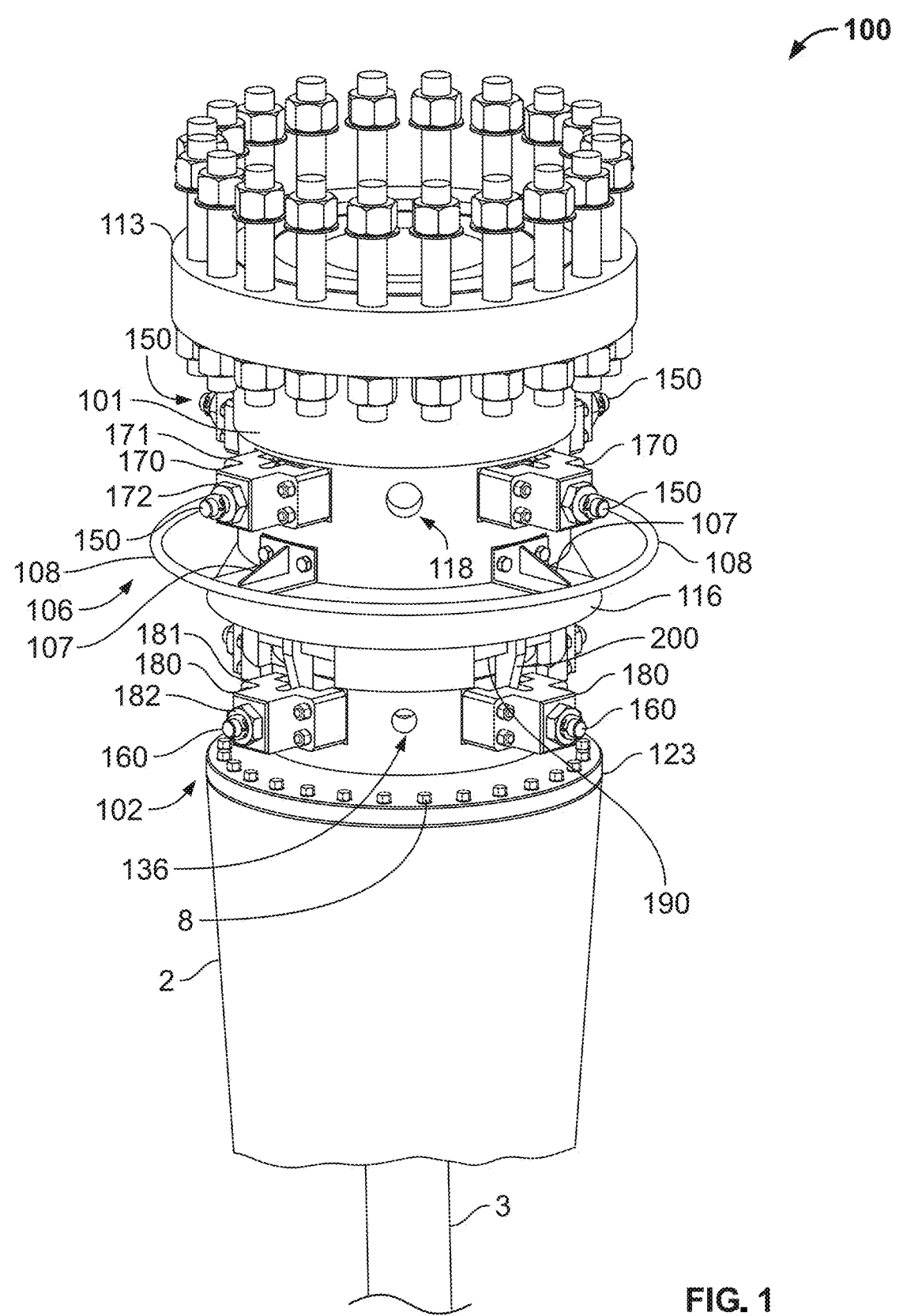
FIG. 1 depicts a perspective view of an illustrative connector assembly configured to be connected to an offshore structure that includes a conduit protection apparatus connected to the connector assembly, according to one or more embodiments described.

A detailed description will now be provided. Each of the appended claims defines a separate invention, which for infringement purposes is recognized as including equivalents to the various elements or limitations specified in the claims. Depending on the context, all references to the "invention", in some cases, refer to certain specific or preferred embodiments only. In other cases, references to the "invention" refer to subject matter recited in one or more, but not necessarily all, of the claims. It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the formation of a first feature over or on a second feature in the description that follows includes embodiments in which the first and second features are formed in direct contact and also includes embodiments in which additional features are formed interposing the first and second features, such that the first and second features are not in direct contact. The exemplary embodiments presented below may be combined in any combination of ways, i.e., any element from one exemplary embodiment may be used in any other exemplary embodiment, without departing from the scope of the disclosure. The figures are not necessarily drawn to scale and certain features and certain views of the figures can be shown exaggerated in scale or in schematic for clarity and/or conciseness.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Also, the naming convention used herein is not intended to distinguish between components that differ in name but not function. Furthermore, in the following discussion and in the claims, the terms "including" and "comprising" are used in an open-ended fashion, and thus should be interpreted to mean "including, but not limited to."

As used herein, the term "bolt" means an elongated member that spans between a first structure and a second structure to secure the first and second structures together. For example, the term "bolt" includes a lock bolt or a dead bolt that spans between a doorframe and a door.

Further, the term "or" is intended to encompass both exclusive and inclusive cases, i.e., "A or B" is intended to be synonymous with "at least one of A and B," unless otherwise expressly specified herein. The indefinite articles "a" and "an" refer to both singular forms (i.e., "one") and plural referents (i.e., one or more) unless the context clearly dictates otherwise. The terms "up" and "down"; "upward" and "downward"; "upper" and "lower"; "upwardly" and "downwardly"; "above" and "below"; and other like terms used herein refer to relative positions to one another and are not intended to denote a particular spatial orientation since the apparatus and methods of using the same may be equally effective at various angles or orientations.

It should also be understood that the phrases "disposed therein", "disposed within", "disposed on", "disposed thereabout" and other similar phrases, when describing a component, describe the component as being partially disposed therein/within/on/about or completely disposed therein/within/on/about.

FIG. 1 depicts a perspective view of a connector assembly 100 configured to be connected to an offshore structure (not shown) that includes a conduit protection apparatus 2 connected to the connector assembly, according to one or more embodiments. The connector assembly 100 can be configured to be connected to the offshore structure at or toward a first end 101 thereof. In some embodiments, the offshore structure can be a fixed platform, a floating platform such as a semisubmersible platform, or a tension leg platform; a floating vessel such as a floating storage offloading unit (FSO), a floating storage and re-gasification unit (FSRU), a floating production storage and offloading (FPSO) unit, or any other type of offshore structure. In some embodiments, the offshore structure can be a fixed wind platform or a floating wind platform.

In some embodiments, the connector assembly 100 can be connected to an I-tube, a J-tube, or other apparatus (not shown) connected to or otherwise disposed on the offshore structure. In some embodiments, the connector assembly 100 can be connected to the I-tube, J-tube, or other apparatus at or toward the first end 101 of the connector assembly 100. In some embodiments, the connector assembly 100 can be configured to receive or be attached to the conduit protection apparatus 2 at or toward a second end 102 of the connector assembly 100. In some embodiments, the conduit protection apparatus 2 can be a bend restrictor, a bend stiffener, or any other appurtenance that can be disposed about an exterior surface of a conduit 3 and connected to an offshore structure via the connector assembly 100. In some embodiments, the conduit protection apparatus 2 can be configured to keep a bending moment from over stressing the conduit 3 when the offshore structure and the conduit 3 are subjected to motions relative to one another and/or metocean conditions and/or other loadings. In some embodiments, the conduit protection apparatus 2 can be disposed about the conduit 3 and the conduit 3 can be movable relative to the conduit protection apparatus 2 along a length of the conduit 3.

Figure 2:
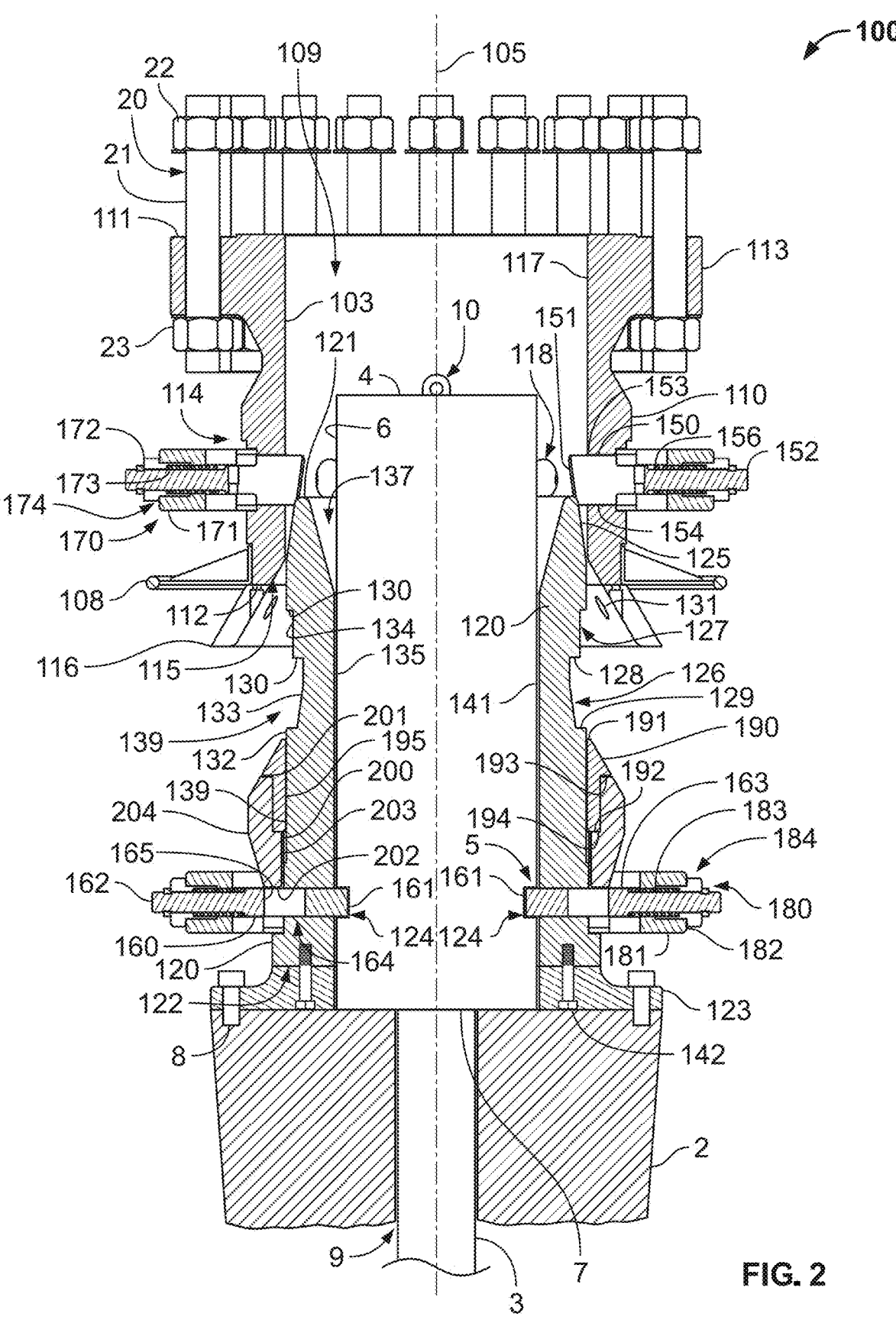
FIG. 2 depicts a cross-sectional elevation view of the connector assembly shown in FIG. 1 that includes a first tubular member configured to be connected to the offshore structure and a second tubular member connected to the conduit protection apparatus, where the first tubular member and the second tubular member are in an unconnected position relative to one another, according to one or more embodiments described.

FIG. 2 depicts a cross-sectional elevation view of the connector assembly 100 shown in FIG. 1 that includes a first tubular member 110 configured to be connected to the offshore structure and a second tubular member 120 configured to be connected to the conduit protection apparatus 2, where the first tubular member 110 and the second tubular member 120 are in an unconnected position relative to one another, according to one or more embodiments. The first tubular member 110 can be configured to be connected to the offshore structure at or toward the first end 111 of the first tubular member 110. The second tubular member 120 can have a first end 121, a second end 122, and can define a bore 137 that extends therethrough from the first end 121 to the second end 122 thereof. In some embodiments, second tubular member 120 can be configured to be connected to the conduit protection apparatus 2 at or toward the second end 122 of the second tubular member 120. As shown in FIG. 1, the second tubular member 120 can be configured to receive and include a conduit end termination 4 at least partially within the bore 137 defined by the second tubular member 120. In some embodiments, the conduit end termination 4 can be an end termination of the conduit 3 that can be disposed on an end 7 of the conduit 3 and positioned or disposed at least partially within the bore 137 defined by the second tubular member 120. In some embodiments, an outer surface 6 of the conduit end termination 4 can define one or more grooves 5. In other embodiments, one or more of the one or more grooves 5 can be replaced with one or more apertures that extend through the outer sidewall of the conduit end termination 4.

The connector assembly 100 can include a plurality of first bolts 150 and a plurality of second bolts 160. The plurality of first bolts 150 can be configured to pass through a corresponding aperture 114 defined by a sidewall 103 of the first tubular member 110 and into a bore 109 defined by the first tubular member 110. The plurality of second bolts 160 can be configured to pass through a corresponding aperture 124 defined by a sidewall 135 of the second tubular member 120 and into the bore 137 defined by the second tubular member 120. As shown in FIG. 2, the plurality of first bolts 150 can be in an unlocked position and one or more of the plurality of second bolts 160 can be in a latched position relative to the conduit end termination 4. When one or more of the plurality of second bolts 160 are in the latched position, a first end 161 of the one or more of the plurality of second bolts 160 can be located within the groove (or aperture) 5 or a corresponding one of the one or more grooves (or apertures) 5.

Figure 3:
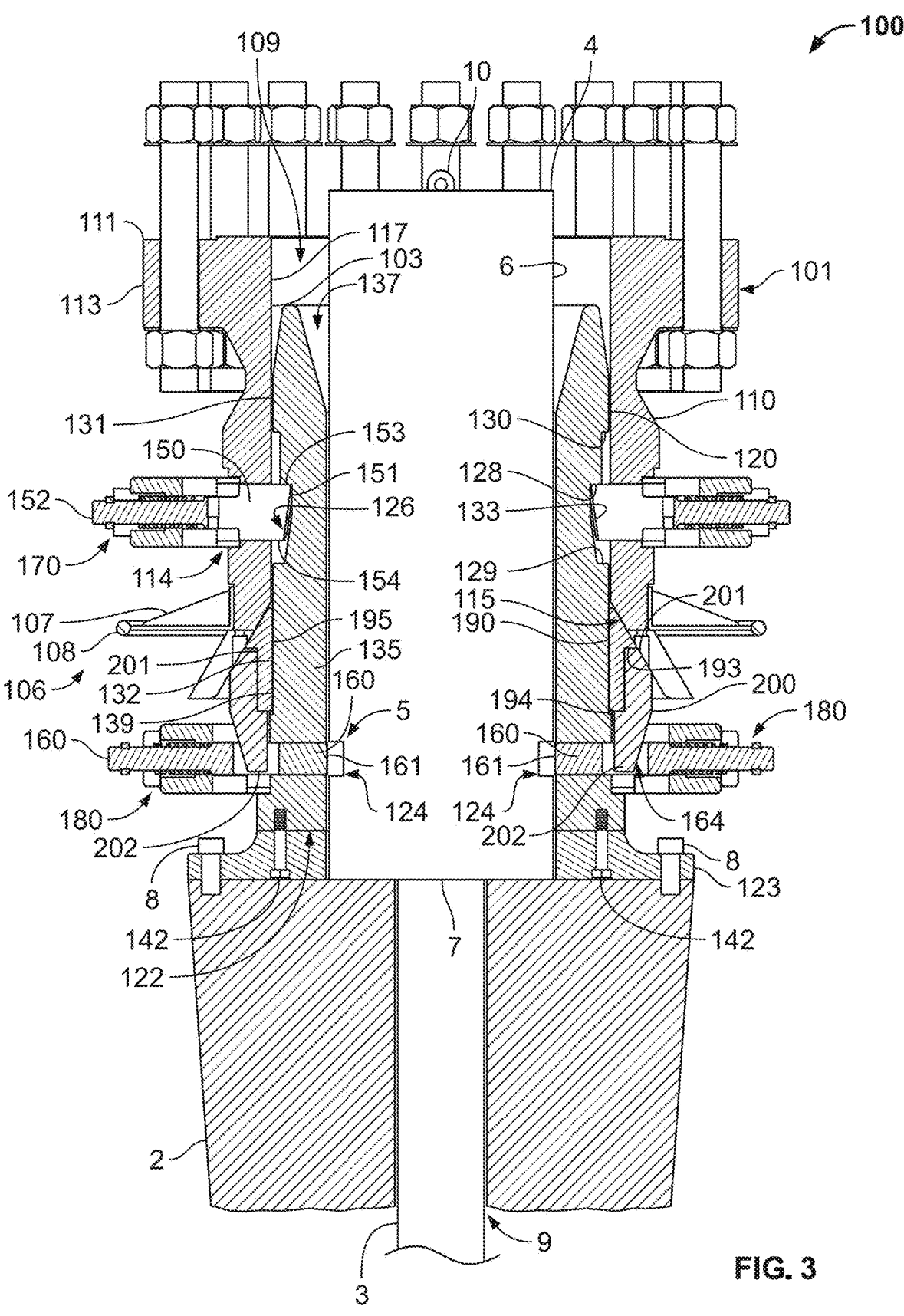
FIG. 3 depicts a cross-sectional view of the connector assembly shown in FIG. 2 with the first and second tubular members connected to one another and with the second tubular member in a first position relative to the first tubular member, according to one or more embodiments described.
Figure 4:
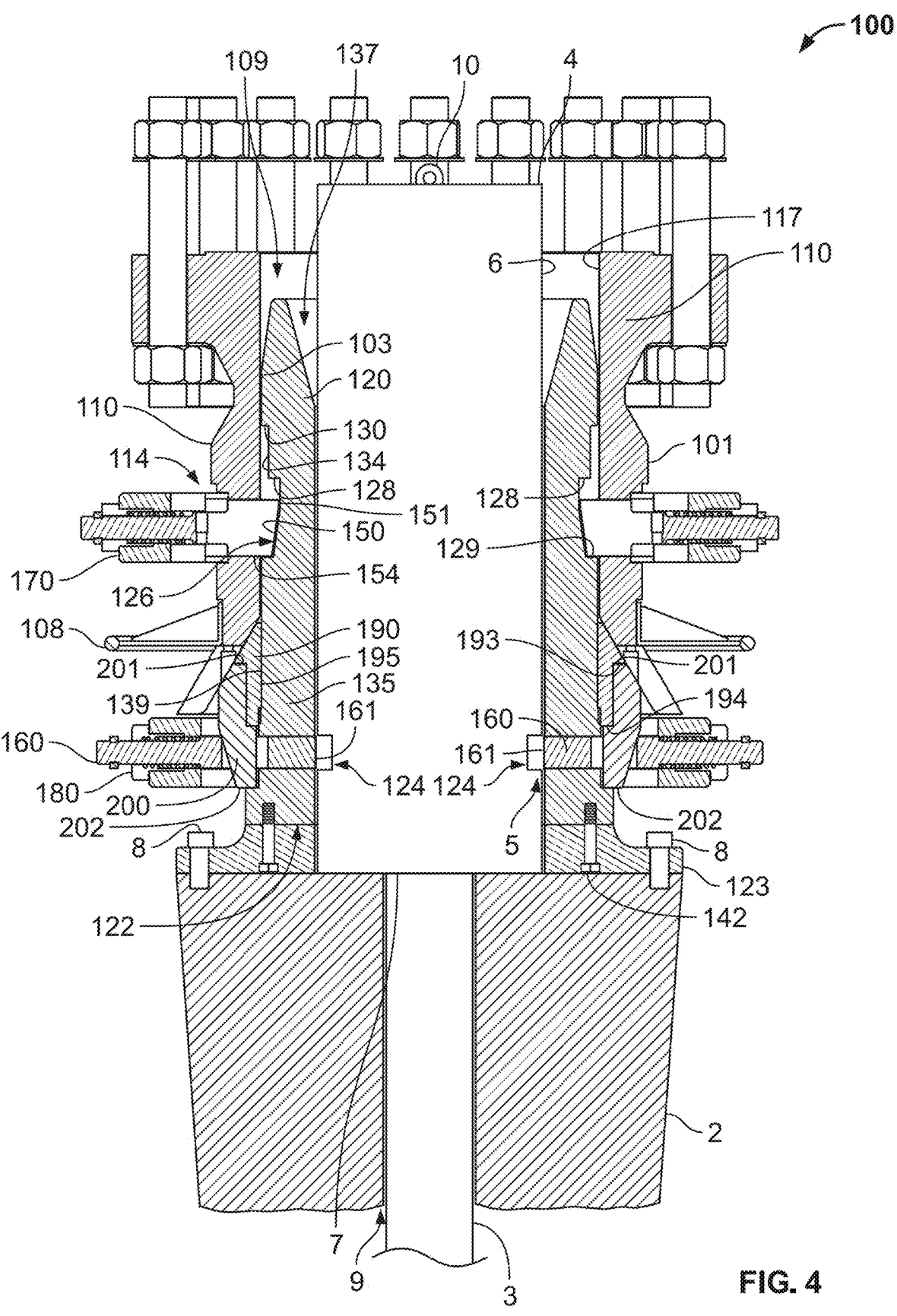
FIG. 4 depicts a cross-sectional elevation view of the connector assembly shown in FIG. 2 with the first and second tubular members connected to one another and with the second tubular member in a second position relative to the first tubular member, according to one or more embodiments described.

FIG. 3 depicts a cross-sectional elevation view of the connector assembly 100 shown in FIG. 2 with the first and second tubular members 110, 120 connected to one another and with the second tubular member 120 in a first position relative to the first tubular member 110. As shown in FIG. 3, the plurality of first bolts 150 can be in a first locked position and the plurality of second bolts 160 can be in an unlatched position, as shown, or the latched position, not shown. In some embodiments, an outer surface 139 of the second tubular member 120 can define one or more grooves 126. As shown, a first end 151 of each of the plurality of first bolts 150 can be configured to be located within the groove 126 or a corresponding one of the one or more grooves 126 at a first position therein. FIG. 4 depicts a cross-sectional elevation view of the connector assembly 100 shown in FIG. 2 with the first and second tubular members 110, 120 connected to one another and with the second tubular member 120 in a second position relative to the first tubular member 110. As shown in FIG. 4, the plurality of first bolts 150 can be in the first locked position and the first end 151 of each first bolt 150 can be located within the groove 126 or the corresponding one of the one or more grooves 126 at a second position therein and the plurality of second bolts 160 can be in the unlatched position. As is explained in more detail below, in some embodiments, the plurality of second bolts 160 can be held or maintained in the unlatched position by a plurality of release keys 200 when the second tubular member 120 is in a second position relative to the first tubular member 110.

Figure 5:
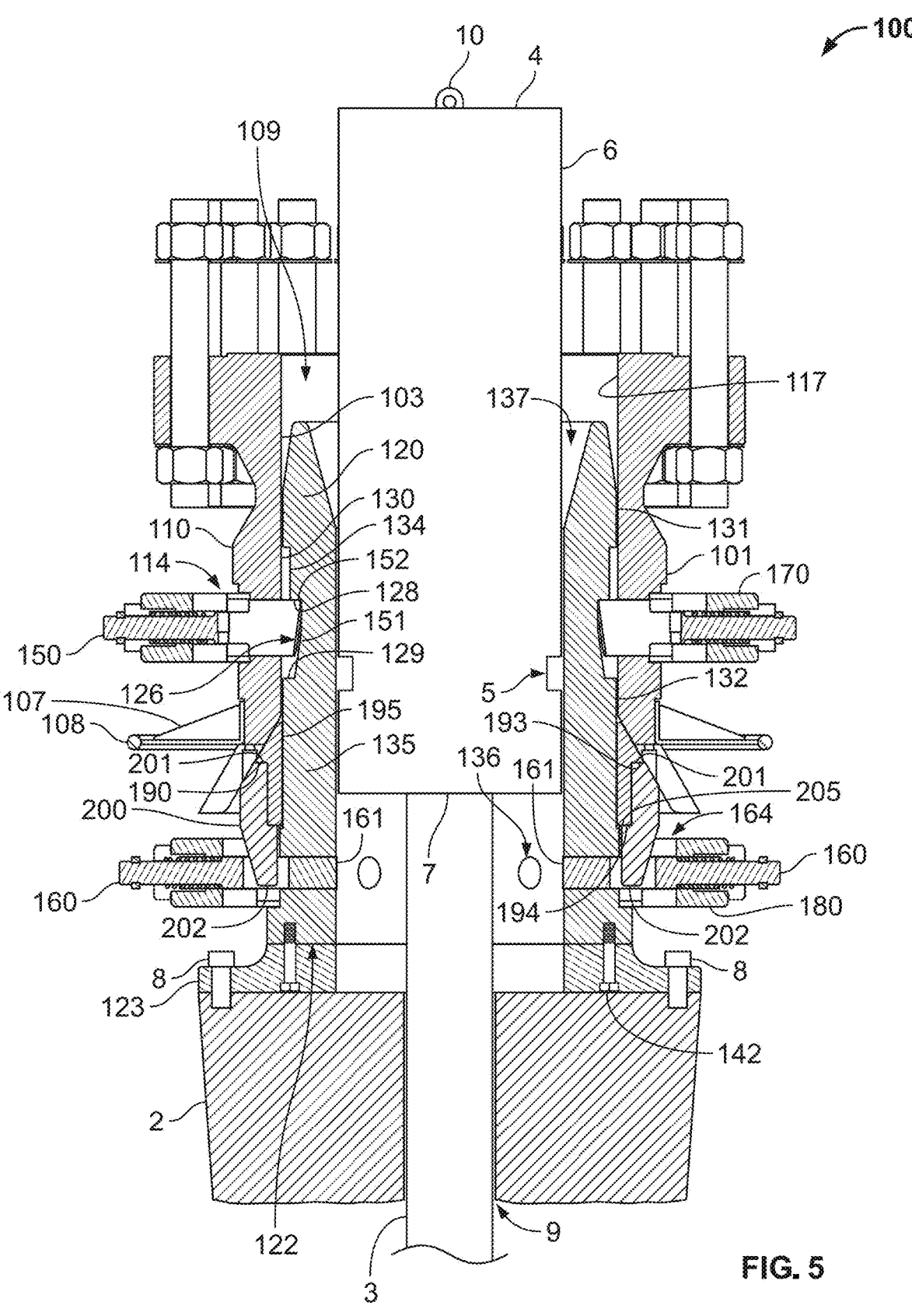
FIG. 5 depicts a cross-sectional elevation view of the connector assembly shown in FIG. 3 with the first and second tubular members connected to one another and with the second tubular member in the first position relative to the first tubular member with a conduit end termination and a conduit that are in a pulled-through position relative to the first and second tubular members, according to one or more embodiments described.
Figure 6:
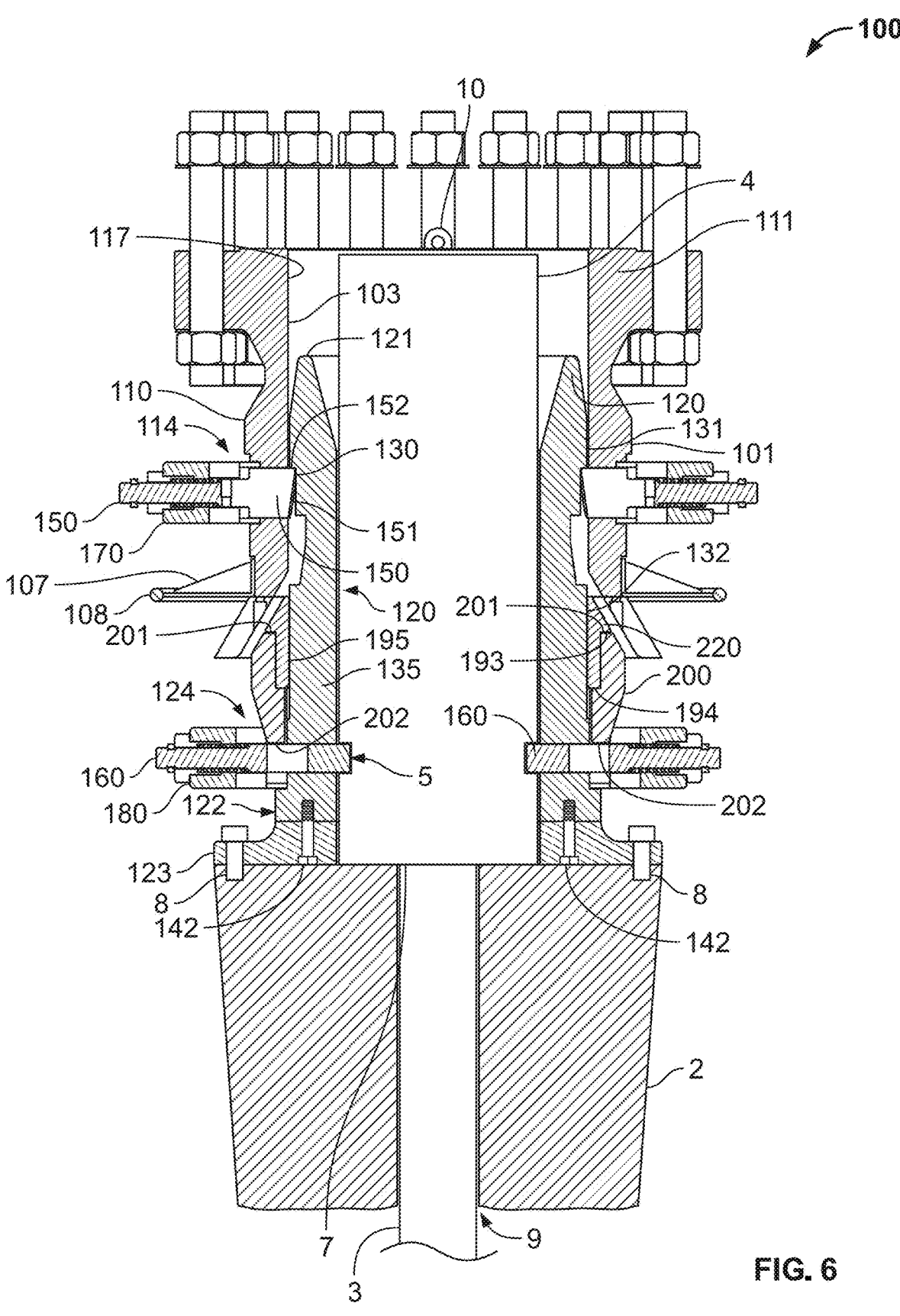
FIG. 6 depicts a cross-sectional elevation view of the connector assembly shown in FIG. 2 with the first and second tubular members connected to one another with the second tubular member in a third position relative to the first tubular member, according to one or more embodiments described.

FIG. 5 depicts a cross-sectional elevation view of the connector assembly 100 shown in FIG. 3 with the first and second tubular members 110, 120 connected to one another and with the second tubular member 120 in the first position relative to the first tubular member 110 and with the conduit end termination 4 and the conduit 3 in a pulled-through position relative to the first and second tubular members 110, 120. As shown, the plurality of first bolts 150 can be in the first locked position and the plurality of second bolts 160 can be in the unlatched position to permit the conduit end termination 4 and the conduit 3 to be pulled through the second tubular member 120. FIG. 6 depicts a cross-sectional elevation view of the connector assembly 100 shown in FIG. 2 with the second tubular member 120 in a third position relative to the first tubular member 110, according to one or more embodiments. As shown, the plurality of first bolts 150 can be in a second locked position and the plurality of second bolts 160 can be in the latched position such that the plurality of second bolts 160 secures the conduit end termination 4 to the second tubular member 120. The plurality of first bolts 150, as shown in FIG. 6, can be retracted or otherwise moved outwardly with respect to the first tubular member 110 such that the first ends 151 of the plurality of first bolts 150 extend a shorter distances into the bore 109 defined by the first tubular member 110 as compared to when the second tubular member 120 is in the first position or the second position relative to the first tubular member 110, as shown in FIGS. 3 and 4. In some embodiments, when the second tubular member 120 is moved from the third position relative to the first tubular member 110 (as shown in FIG. 6) to the second position relative to the first tubular member 110 (as shown in FIG. 4), the plurality of first bolts 150 can remain disposed within the first groove 126 defined by the second tubular member 120 and the plurality of second bolts 160 can move from the latched position to the unlatched position.

As shown, the groove 5 can be a circumferential groove that can extend about an outer perimeter or surface of the conduit end termination 4. In other embodiments, however, the groove 5 can extend partially about an outer perimeter or surface of the conduit end termination 4. In still other embodiments, however, the outer surface 6 of the conduit end termination 4 can define a plurality of grooves 5 that can be spaced apart from one another about the outer surface 6 of the conduit end termination 4. It should be understood that when the outer surface 6 of the conduit end termination 4 defines a plurality of grooves 5, the plurality of grooves 5 can be aligned with respect to an central axis 105 of the connector assembly 100, located at varying positions about the outer perimeter or surface of the conduit end termination 4 between the ends of the conduit end termination 4, or two or more grooves 5 can be aligned with respect to the central axis 105 and one or more grooves 5 can be located at a different position with respect to the two or more aligned grooves 5.

Referring to FIGS. 1 to 6 collectively, in some embodiments, the first tubular member 110 can be a substantially tubular structure and can include a first end 111 and a second end 112. In some embodiments, the first end 111 of the first tubular member 110 can include or define a flange 113 disposed thereon and can be configured to secure the first tubular member 110 to the offshore structure via a plurality of fasteners 20. In some embodiments, the flange 113 can be connected to an I-tube or a J-tube of an offshore structure. In some embodiments each fastener 20 of the plurality of fasteners 20 can include a threaded stud 21, a first nut 22, and a second nut 23. In other embodiments, the plurality of fasteners 20 can include a threaded bolt and nut. In still other embodiments, the first end 111 of the first tubular member 110 can be configured to be secured to the offshore structure via a hub and clamp connector or a weld. In other embodiments, the first end 111 of the first tubular member 110 can include a plurality of threaded bores configured to receive a plurality of threaded bolts. Depending, at least in part, on the particular manner the first tubular member 110 is configured to connect to the offshore structure, the first end of the first tubular member 110 can include the flange 113 or can be free of the flange 113. For example, if the first end 111 of the first tubular member 110 is to be connected via a weld or includes a plurality of threaded bores configured to receive a corresponding bolt, the sidewall of the first tubular member 110 can have a substantially constant thickness from the first end 111 to the second end 112 thereof.

In some embodiments, the bore 109 defined by the first tubular member 110 can include a frusto-conical or other flared inner surface 115. In such embodiments, the flared frusto-conical or other flared inner surface 115 can help to guide the second tubular member 120 into the bore 109 defined by the first tubular member 110. In other embodiments, the first tubular member 110 can include a guide funnel 116 disposed on or toward the second end 112 of the first tubular member 110. In such embodiments, the frusto-conical inner surface 115 or, if present, the guide funnel 116 present, the frusto-conical inner surface 115 can help to guide the second tubular member 120 into the bore 109 defined by the first tubular member 110.

As noted above, the sidewall 103 of the first tubular member 110 can define the plurality of apertures 114 therethrough. In some embodiments, each aperture in the plurality of apertures 114 can have a rectangular cross-sectional shape and at least a portion of an interior surface 117. In other embodiments, each of the plurality of apertures 114 can have circular, a triangular, an oval, a pentagonal, a hexagonal, or any other cross-sectional shape. It should be understood that in some embodiments, any two or more of the apertures in the plurality of apertures 114 can have the same cross-sectional shape or different cross-sectional shapes with respect to one another.

In some embodiments, the sidewall 103 of the first tubular member 110 can further define at least one inspection port 118 therethrough, one is visible in FIG. 1 and two are visible in FIG. 2. The first tubular member 110 can also include a grab bar assembly 106 that can be configured to assist one or more divers or one or more remotely operated vehicles to inspect or otherwise interact with the connector assembly 100. In some embodiments, the grab bar assembly 106 can include a grab bar 108 and a plurality of brackets 107. In some embodiments, the grab bar 108 can be connected to or mounted on the first tubular member 110 via the plurality of brackets 107. The grab bar 108 can have any desired shape when viewed in plan view and can extend partially or completely around an outer perimeter of the first tubular member 103. In some embodiments, the grab bar 108 can be circular, rectangular, pentagonal, hexagonal, heptagonal, octagonal, any other shape, or combination of shapes. The first tubular member 110 and the components connected thereto, e.g., the grab bar assembly 106 can be formed or otherwise made from any suitable material(s). In some embodiments, the first tubular member 110 and the components connected thereto can be fabricated steel structures, steel forgings, steel castings, or any other similar material or combination of materials that are suitable for offshore service.

As noted above, in some embodiments, the second tubular member 120 can be a substantially tubular structure and can include the first end 121 and the second end 122 and the second tubular member 120 can be partially inserted into or partially disposed within the bore 109 defined by the first tubular member 110. In some embodiments, the first end 121 of the second tubular member 120 can be formed into or otherwise define a frusto-conical exterior surface 125. The frusto-conical exterior surface 125 defined by the first end 121 of the second tubular member 120 can be configured to interface or otherwise engage with the guide funnel 116 and/or the frusto-conical inner surface 115 defined by the first tubular member 110 to guide the first end 121 of the second tubular member 120 into the bore 109 defined by the first tubular member 110.

In some embodiments, the second end 122 of the second tubular member 120 can include or define a second flange 123 disposed thereon that can be configured to secure the conduit protection apparatus 2 to the second tubular member 120. In some embodiments, the conduit protection apparatus 2 can be secured to the second flange 123 via a plurality of fasteners 8 as shown in FIGS. 2 to 6. In other embodiments, the second end 122 of the second tubular member 120 can include a plurality of threaded bores configured to receive a plurality of threaded bolts. Depending, at least in part, on the particular manner the second tubular member 120 is configured to connect to the conduit protection apparatus 2, the second end 122 of the second tubular member 120 can include the flange 123 or can be free of the flange 123. For example, if the second end 122 of the second tubular member 120 is to be connected via a weld or includes a plurality of threaded bores configured to receive a corresponding bolt, the sidewall of the second tubular member 120 can have a substantially constant thickness from the first end 121 to the second end 122 thereof. In some embodiments, the second flange 123 can be attached or connected to the second end 122 via a plurality of bolts 142.

As noted above, in some embodiments, the conduit 3 can include the conduit end termination 4. In some embodiments, the conduit 3 can be disposed through the bore 137 defined by the second tubular member 120 prior to installing the conduit end termination 4 onto the conduit 3. In some embodiments, the conduit 3 can be disposed through a bore 137 defined by the second tubular member 120 and through the conduit protection apparatus 2 prior to installing the conduit end termination 4 onto the conduit 3.

In some embodiments, the aperture(s) (or grooves) 5 defined by the second tubular member 120 can have a rectangular cross-sectional shape. In other embodiments, not shown, each of the plurality of apertures 124 can have circular cross sectional shape, an oval cross sectional shape, any other polygonal cross sectional shape, e.g., triangular, pentagonal, hexagonal, etc., or any other cross sectional shape. The second tubular member 120 can further define at least one inspection port 136 therethrough. In some embodiments, the second tubular member 120 can define one, two, three, four, or more inspection ports 136 therethrough. In at least one embodiment, the second tubular member 136 can define four inspection ports 136 that can be equally or substantially equally spaced about a perimeter of the second member 120.

In some embodiments, the second tubular member 120 can define a first cylindrical exterior surface 131 that can be disposed toward the first end 121 of the second tubular member 120 and a second cylindrical exterior surface 132 that can be disposed toward the second end 122 of the second tubular member 120. As noted above, the second tubular member 120 can define the one or more first grooves 126 on the exterior surface 139 of the second tubular member 120. In some embodiments, the first groove 126 can be a circumferential groove. In other embodiments, however, the first groove 126 can extend partially about an outer circumference of the second tubular member 120. In still other embodiments, the outer surface 139 of the second tubular member 120 can define a plurality of first grooves 126 that can be spaced apart from one another about the exterior surface 139 of the second tubular member 120. It should be understood that when the exterior surface 139 of the second tubular member 120 defines a plurality of first grooves 126, the plurality of first grooves 126 can be aligned with respect to the central axis 105 of the connector assembly 100, located at varying positions about a perimeter of the second tubular member 120 between the first end 121 and the second end 122 of the second tubular member 120, or two or more first grooves 126 can be aligned with respect to the central axis 105 and one or more first grooves 126 can be located at a different position with respect to the two or more aligned first grooves 126. In some embodiments, the first groove 126 can be defined by a first shoulder 128 located toward the first end 121 of the second tubular member 120, a second shoulder 129 located toward the second end of the second tubular member 120, and a first groove surface 133 located between the first shoulder 128 and the second shoulder 129. As such, in some embodiments, the first shoulder 128 and the second shoulder 129 can face one another. It should be understood that when the second tubular member 120 defines a plurality of first grooves 126, each first groove 126 in the plurality of first grooves 126 can be defined by a corresponding first shoulder 128, a corresponding second shoulder 129, and a corresponding first groove surface 133.

As shown, in some embodiments, the second tubular member 120 can have or define an optional second groove 127 that can be defined by a third shoulder 130 located toward the first end 121 of the second tubular member 120 and a second groove surface 134 located between the third shoulder 130 and the first shoulder 128. In such embodiments, the first groove 126 can be defined by the third shoulder 130 located toward the first end 121 of the second tubular member, a second groove surface 134 located between, the first shoulder 128 and the third shoulder 130, the first groove surface 133, and the second shoulder 129 . . . . The second tubular member 120 can be a fabricated steel structures, steel forgings, steel castings, or any other similar material or combination of materials that are suitable for offshore service.

In some embodiments, the second groove 127 can be a circumferential groove disposed about an outer perimeter of the second tubular member 120. In other embodiments, however, the second groove 127 can extend partially about an the outer perimeter of the second tubular member 120. In still other embodiments, the outer surface 139 of the second tubular member 120 can define a plurality of second grooves 127 that can be spaced apart from one another about the exterior surface 139 of the second tubular member 120. It should be understood that when the exterior surface 139 of the second tubular member 120 defines a plurality of second grooves 127, the plurality of second grooves 127 can be aligned with respect to the central axis 105 of the connector assembly 100, located at varying positions about a perimeter of the second tubular member 120 between the first end 121 and the second end 122 of the second tubular member 120, or two or more second grooves 127 can be aligned and one or more second grooves 127 can be located at different positions with respect to the two or more aligned second grooves 127.

In some embodiments, the plurality of first bolts 150 can be connected to or otherwise disposed on the first tubular member 110. Each first bolt 150 can include the first end 151, a second end 152, a first surface 153, a second surface 154, and a shoulder 156. In some embodiments, the first end 151 of the first bolts 150 can have a curved profile or surface configured to engage with a corresponding curved profile or surface of the first groove 126 or the one or more first grooves 126. In some embodiments, the first end 151 of the first bolts 150 can have a frusto-conical shape that can be configured to engage with a corresponding frusto-conical shape or surface of the first groove 126.

In some embodiments, a first dimension of each first bolt 150 can be defined as a distance between the first surface 153 and the second surface 154. As noted above, each of the plurality of first bolts 150 can be at least partially disposed within the corresponding aperture 114 defined by the sidewall 135 of the first tubular member 110 and can be moveable relative to the first tubular member 110 in a direction relative to the central axis 105 of the connector assembly 100. As also noted above, each first bolt 150 can be positioned in an unlocked position, in a first locked position as shown in FIGS. 3, 4 and 5, and in a second locked position as shown in FIG. 6 relative to the first tubular member 110. When the plurality of first bolts 150 are in the unlocked position, the first end 151 of each first bolt 150 does not protrude or does not substantially protrude into the bore 109 defined by the first tubular member. Said another way, when the first bolts 150 are in the unlocked position, the first bolts 150 can be positioned relative to the first tubular member 110 such that the second tubular member 120 can be inserted at least partially into the bore 109 defined by the first tubular member 110.

As shown in FIG. 3, when the first bolts 150 are in the first locked position and the second tubular member 120 is in the first position relative to the first tubular member 110, each of the first bolts 150 can be disposed through a corresponding aperture 114 defined by the first tubular member 110 and the first end 151 of each first bolt 150 can be partially disposed within the first groove or a corresponding one of the plurality of first grooves 126 defined by the second tubular member 120. Said another way, a portion of the first surface 153 of each first bolt 150 can be in contact with or abut against the first shoulder 128 defined by the second tubular member 120 to secure the second tubular member 120 to the first tubular member 110 in at least one direction along the central axis 105. In some embodiments, when the connector assembly 100 is in a vertical orientation and the first tubular member 110 is secured to the offshore structure, the first shoulder 128 can rest on a portion of the first surface 153 of at least one of the plurality of first bolts 150 to vertically support and secure the second tubular member 120 within the bore 109 defined by the first tubular member 110.

As shown in FIG. 4, when the first bolts 150 are in the first locked position and the second tubular member 120 is in the second position relative to the first tubular member 110, each of first bolts 150 can be disposed through the corresponding aperture 114 of the first tubular member 110 and the first end 151 of each first bolt 150 can be at least partially disposed within the first circumferential groove 126 defined by the second tubular member 120 to constrain a movement of the second tubular member 120 relative the first tubular member 110 in at least one direction along the central axis 105 of the connector assembly. A portion of the second surface 154 of at least one of the plurality of first bolts 150 can be in contact with or abut against the second shoulder 129 defined by the second tubular member 120 to stop or restrict a movement of the second tubular member 120 relative to the first tubular member 110 in one direction along the central axis 105 of the connector assembly. When the connector assembly 100 is in a vertical orientation and the first tubular member 110 is secured to the offshore structure, the second tubular member 120 can be prevented from moving upward beyond the second position relative to the first tubular member 110 when the second surface 154 of at least one of the plurality first bolts 150 abuts against the second shoulder 129 defined by the second tubular member 120.

As shown in FIG. 5, when the first bolts 150 are in the first locked position and the second tubular member 120 is in the first position relative to the first tubular member 110, at least one of the plurality of first bolts 150 can be disposed through a corresponding aperture 114 of the first tubular member 110 and the first end 151 of at least one of the plurality of first bolts 150 can be partially disposed within the first groove or a corresponding one of the plurality of first grooves 126 defined by the second member. A portion of the first surface 153 of at least one of the plurality of first bolts 150 can be in contact with or abut against the first shoulder 128 defined by the second tubular member 120 to secure the second tubular member 120 to the first tubular member 110 in at least one direction along the central axis 105 of the connector assembly. When the connector assembly 100 is in a vertical orientation and the first tubular member 110 is secured to the offshore structure, the second tubular member 120 can be supported by the first shoulder 128 reacting with or rest on the first surface 153 of at least one of the plurality of first bolts 150.

In embodiments that include the optional second circumferential groove or plurality of second circumferential grooves 127 this is/are defined by the third shoulder 130 located toward the first end 121 of the second tubular member 120 and a second groove surface 134 located between the third shoulder 130 and the first shoulder 128, the first groove 126 and the second groove 127 can be separated from one another. For example, the first groove(s) 126 can be located near a midpoint between first end 121 and the second end 122 of the second tubular member 120 and the optional second groove(s) 127 can be located between the first groove(s) 126 and the first end 121 of the second tubular member 120. In some other embodiments, the first groove(s) 126 can be located adjacent to or within the second groove(s) 127 (as shown).

In embodiments that include the second groove 127, the second tubular member 120 can be positioned at a third position relative to the first tubular member 110 and the plurality of first bolts 150 can be in a second locked position as shown in FIG. 6. When the plurality of first bolts 150 are in the second locked position and the second tubular member 120 is in the third position relative to the first tubular member 110, at least one of the plurality of first bolts 150 can be disposed through a corresponding aperture 114 of the first tubular member 110 and the first end 151 of at least one of the plurality of first bolts 150 can be partially disposed within the second groove 127 defined by the second tubular member 120. Said another way, a portion of the first surface 153 of at least one of the plurality of first bolts 150 can be in contact with or abut against the third shoulder 130 defined by the second tubular member 120 to secure the second tubular member 120 to the first tubular member 110 in at least one direction along the central axis 105. In some embodiments, when the connector assembly 100 is in a vertical orientation and the first tubular member 110 is secured to the offshore structure, the third shoulder 130 can rest on a portion of the first surface 153 of each first bolt 150 to vertically support the second tubular member 120. In some embodiments, when the second tubular member 120 moves between the first position, the second position, and third position, the plurality of first bolts 150 can move between the first locked position and the second locked position without passing through the unlocked position. In other embodiments, when the second tubular member 120 moves between the first position, the second position, and third position, the plurality of first bolts 150 can move between the first locked position, the unlocked position and the second locked position.

In some embodiments, a distance between the first surface 153 and the second surface 154 of each of the first bolts 150 in a direction that is parallel to the central axis 105 can be less than a distance between the first shoulder 128 and the second shoulder 129 in a direction that is parallel to the central axis 105 such that the second tubular member 120 can move relative to the first tubular member 110 between the first position and the second position when the plurality of first bolts 150 is disposed in the first locked position. Said another way, when the first end 151 of each of the plurality of first bolts 150 is disposed within the first groove or a corresponding first groove 126 defined by the second tubular member 120, the second tubular member 120 can move relative to the first tubular member 110 between the first position and the second position.

In some embodiments, the plurality of second bolts 160 can each include a first end 161, a second end 162, and a first surface 163. The plurality of second bolts 160 can be disposed on the second tubular member 120 and can be movable between a latched position as shown in FIGS. 2 and 6 and an unlatched position as shown in FIGS. 3, 4, and 5. Each of the plurality of second bolts 160 can be at least partially disposed within or through a corresponding aperture 124 defined by the second tubular member 120 and can be configured to engage with or be partially disposed within the groove or aperture 5 or a corresponding groove or aperture 5 defined by the outer surface 6 of the conduit end termination 4 when the plurality of second bolts 160 is in the latched position and when the conduit end termination 4 is in a latchable position. In some embodiments, the groove 5 can be a circumferential groove defined by the outer surface 6 of the conduit end termination 4. In other embodiments, the groove 5 can be a groove that partially extends about the outer surface 6 of the conduit end termination 4. In still other embodiments, the outer surface 6 of the conduit end termination 4 can define a plurality of grooves 5 that can each be configured to at least partially receive the first end 161 of a corresponding second bolt 160.

When the plurality of second bolts 160 is in the unlatched position, the plurality of second bolts 160 can be positioned away from the central axis 105 of the connector assembly 100 such that a first end 161 of each second bolt 160 is not positioned within the groove or a corresponding groove 5 defined by the conduit end termination 4 and the conduit end termination 4 is not secured to the second tubular member 120. Said another way, the first end 161 of each of the second bolts 160 does not protrude into the bore 137 defined by the second tubular member 120. In some embodiments, each second bolt 160 can define a bore 164 therethrough that can be orientated substantially parallel to the central axis 105 of the connector assembly 100. In some embodiments, the bore 164 defined by each second bolt 160 can have a rectangular cross section and can define at least one interior surface 165.

In some embodiments, the connector assembly 100 can include a release ring 190 that can be disposed about an exterior surface 139 of the second tubular member 120. In some embodiments, the release ring 190 can be disposed about an exterior surface 139 of the second tubular member 120 toward the second end 122 of the second tubular member 120. For example, as shown in FIG. 2-6, the release ring 190 can be disposed between the second end 122 of the second tubular member 120 and the second shoulder 129 defined by the second tubular member 120. In some embodiments, the release ring 190 can be configured to slide or move relative to the second tubular member 120 in a direction that is parallel to the central axis 105 of the connector assembly 100. The release ring 190 can include a first end 191 and a second end 192. The first end 191 can be configured to interface with or abut against the second end 112 of the first tubular member 110. In some embodiments, the first end 191 of the release ring 190 can be formed into a frusto-conical shape that can interface with or abut against the frusto-conical interior surface 115 of the first tubular member 110.

In some embodiments, the release ring 190 can be a continuous structure having an inner surface 195 that corresponds to the exterior surface 139 of the second tubular member 120. For example, if the exterior surface 139 of the second tubular member 120 is cylindrical, the release ring 190 can be a continuous cylindrical ring having an inner diameter sufficiently large to permit the release ring 190 to move relative to the second tubular member 120 that is parallel to the central axis 105 of the connector assembly 100. In other embodiments, the release ring 190 can be a discontinuous structure having an inner surface that corresponds to the exterior surface 129 of the second tubular member 120. For example, if the exterior surface 139 of the second tubular member 120 is cylindrical, the release ring 190 can be a discontinuous cylindrical ring, e.g., a split ring, having an inner diameter sufficiently large to permit the release ring 190 to move relative to the second tubular member 120 that is parallel to the central axis 105 of the connector assembly 100.

In some embodiments the connector assembly 100 can include a plurality of release keys 200. Each release key 200 can include or can have a first end 201, a second end 202, a first side 203, a second side 204, and a shoulder 205. In some embodiments, each release key 200 can be configured to engage with the release ring 190. In some embodiments, the first end 201 of each release key 200 can be configured to engage with the first shoulder 193 of the release ring 190 and the shoulder 205 of each release key 200 can engage with a second shoulder 194 of the release ring 190, as shown. In some embodiments, the first end 201 of each release key 200 can be configured to engage with a first shoulder 193 of the release ring 190, and each release key 200 can be configured to interface with a corresponding second bolt 160 toward the second end 202 thereof. In some embodiments, the second end 202 of each release key 200 can be configured to be inserted into or partially disposed within the bore 164 defined by a corresponding second bolt 160. In some embodiments, the first side 203 of each release key 200 can be positioned toward the exterior surface 139 of the second tubular member 120 and the second side 204 of each release key 200 can be positioned away from the exterior surface 139 of the second tubular member 120. The second side 204 of each release key 200 can be angled or sloped such that the first end 201 of each release key 200 has a width that is greater than a width of the second end 202 of each release key 200.

In some embodiments, when the second tubular member 120 is moved from the first position to the second position relative to the first tubular member 110, the plurality of release keys 200 can move the plurality of second bolts 160 from the latched position to the unlatched position. In some embodiments, when the second tubular member 120 is moved from the first position to the second position, the first end 191 of the release ring 190 can abut against the second end 112 of the first tubular member 110, the shoulder 193 of the release ring 190 can abut against the first end 201 of each release key 200 and the second side 204 of each release key 200 can abut against the interior surface 165 of a corresponding second bolt 160 to move the corresponding second bolt 160 from the latched position to the unlatched position.

In some embodiments, the second tubular member 120 can move from the first position to the second position while the first end 151 of each first bolt 150 remains disposed within the first circumferential groove 126 defined by the second tubular member 120. In some embodiments, the second tubular member 120 can move from the first position to the second position while the first end 151 of each first bolt 150 remains disposed within the first circumferential groove 126 defined by the second tubular member 120 and simultaneously, the first end 191 of the release ring 190 can abut against the second end 112 of the first tubular member 110, the shoulder 193 of the release ring 190 can abut against the first end 201 of each release key 200 and the second side 204 of each of each release key 200 can abut against the corresponding interior surface 165 of each second bolt 160 to such that each of the plurality of second bolts 160 is moved from the latched position to the unlatched position to disconnect the conduit end termination 4 from the second tubular member 120.

In some embodiments, the connector assembly 100 can include a plurality of first bolt actuators 170 and a plurality of second bolt actuators 180. In some embodiments, each first bolt actuator 170 can be configured to apply a radially inward force to a corresponding first bolt 150 to urge, bias, or otherwise push each first bolt 150 radially inward and toward the central axis 105 of the connector assembly 100. In some embodiments, each first bolt actuator 170 can include a housing 171 and a spring 173. In some embodiments, the spring 173 can be a mechanical spring, for example a helical spring that can be disposed between the housing 171 and a corresponding shoulder 156 of the first bolt 150. In some embodiments, the housing 171 can be configured to contain a corresponding first bolt 150 at least partially within a corresponding aperture 114 defined by the first tubular member 110.

In some embodiments, the second end 152 of each first bolt 150 can have a circular, threaded cross section and can extend through a bore 174 defined by the housing 171. In some embodiments, each first bolt actuator 170 can be configured to exert a force acting or pushing the corresponding first bolt 150 toward the central axis 105 of the connector assembly 100 as the second tubular member 120 moves between the first position to the second position such that the first end 151 of each first bolt 150 remains in contact with the second tubular member 120 as the second tubular member 120 moves within the bore 109 defined by the first tubular member 110 and relative to the first tubular member 110. In some embodiments, each first bolt actuator 170 can have a nut 172 that can be threaded onto or be threadingly engaged with the second end 152 of each first bolt 150 and the nut 172 can be configured to react against the housing 171 to move the first bolt 150 from the first locked position or the second locked position to or toward the unlocked position by rotating the nut 172 relative to the first bolt 150.

In some embodiments, each second bolt actuator 180 can be configured to apply a radially inward force to a corresponding second bolt 160 to urge, bias, or otherwise push each second bolt 160 radially inward and toward the central axis 105 of the connector assembly 100. In some embodiments, each second bolt actuator 180 can include a housing 181 and a spring 183. In some embodiments, each housing 181 can be configured to contain a corresponding second bolt 160 at least partially within a corresponding aperture 124 defined by the second tubular member 120. In some embodiments, the spring 183 can be a mechanical spring, for example a helical spring 183 that can be disposed between the housing 181 and a corresponding first surface 163 of the second bolt 160.

In some embodiments, the second end 162 of each second bolt 160 can have a circular, threaded cross section and can extend through a bore 184 defined by the housing 181. In some embodiments, each second bolt actuator 180 can be configured to exert a force acting or pushing the corresponding second bolt 160 toward the central axis 105 of the connector assembly 100 such that each second bolt 160 remains in the latched position and such that the first end 161 of each second bolt 160 remains disposed within the groove 5 of the conduit end termination 4. In some embodiments, each second bolt actuator 180 can have a nut 182 that can be threaded onto or be threadingly engaged with the second end 162 of each second bolt 160 and can be configured to react against the housing 181 to move the second bolt 160 from the latched position to or toward the unlatched position by rotating the nut 182 relative to the first bolt 150.

In some embodiments, when the second tubular member 120 is in the first position or the second position relative to the first tubular member 110, the first exterior surface 131 defined by the second tubular member 120 can abut against the interior surface 117 of the first tubular member 110 and the second exterior surface 132 defined by the second tubular member 120 can abut against the interior surface 117 of the first tubular member 110 to constrain a rotational movement of the second tubular member 120 relative to the first tubular member 110 about an axis that is perpendicular to the central axis 105 of the connector assembly 100. In some embodiments, the first exterior surface 131 and the second exterior surface 132 can each have an external diameter that is less than an internal dimension of the first tubular member 110. In some embodiments, a difference between the internal dimension of the first tubular member 110 and the external dimension of the first exterior surface 131 and the second exterior surface 132 can be between 0.5 mm, 1 mm, 3 mm, 5 mm, 7 mm, or 10 mm to 12 mm, 15, mm, 17 mm, 20 mm, 23 mm, or 25 mm. In some embodiments, the interior surface 117 and the first cylindrical exterior surface 131 and the second exterior surface second exterior surface 132 can be cylindrical. In other embodiments, the interior surface 117 and the first cylindrical exterior surface 131 and the second exterior surface 132 can each have a non-circular cross-sectional shape, e.g., rectangular or other polygonal shape, oval, or the like.

In some other embodiments, not shown, the first end 111 of the first tubular member 110 can define an interior surface that can have a first internal diameter and the second end 112 of the first tubular member 110 can define a second interior surface that can have a second internal diameter. In some embodiments, the first internal diameter of the first tubular member 110 can be less than the second internal diameter of the first tubular member 110. In such embodiments, the first cylindrical exterior surface 131 of the second tubular member 120 can have a first outer diameter and the second cylindrical exterior surface 132 of the second tubular member 120 can have a second outer diameter and the first cylindrical exterior surface 131 of the second tubular member 120 can matingly engage with the first interior surface of the first tubular member 110 and the second interior surface of the first tubular member 110 can matingly engage with the second exterior surface 132 of the second tubular member 120 to restrict a movement or a rotation of the second tubular member 120 relative to the first tubular member 110 about an axis that is perpendicular to the central axis 105.

A process for connecting the conduit protection apparatus 2 to the offshore structure can include obtaining the connector assembly 100. In some embodiments, the process can include securing the first end 111 of the first tubular member 110 to the offshore structure. In some embodiments, the first end 111 of the first tubular member 110 can be secured to an I-tube or a J-tube of the offshore structure via the flange 113 and the plurality of bolts 20 and the plurality of nuts 22, 23. The process can also include positioning the conduit end termination 4 within the bore 137 defined by the second tubular member 120 and securing the conduit protection apparatus 2 to the second end 122 of the second tubular member 120. The process can include disposing the second tubular member 120 within the bore 109 defined by the first tubular member 110 at a first position and positioning the plurality of first bolts 150 in the first locked position such that the first end 151 of each first bolt 150 can be disposed within the first circumferential groove 126 of the second tubular member 120.

In some embodiments, the second tubular member 120 can be disposed within the bore 109 defined by the first tubular member 110 via a lifting device (not shown) disposed on the offshore structure. In some embodiments, the lifting device can be or include, but are not limited to, a lifting device that utilizes a linear moving mechanism, a rotary torque mechanism, or a combination thereof. Suitable lifting devices that utilize a linear moving mechanism can be or can include, but are not limited to, chain jacks, strand jacks, linear winches, or the like. Suitable lifting devices that utilize a rotary torque mechanism can be or can include, but are not limited to, rotary winches that include one or more drums, e.g., single drum rotary winches or two drum rotary winches, a powered windlass, or the like.

In some embodiments, the lifting device can include a lifting line, for example synthetic rope or a wire rope. The lifting device can be disposed on the offshore platform above the first tubular member 110 and through the bore 109 of the first tubular member 110 and connected to an attachment point, e.g., a padeye, clevis, or other attachment apparatus, 10 disposed on the conduit end termination 4. The conduit end termination 4, the conduit protection apparatus 2, and the conduit 3 can then be pulled toward and disposed within the bore 109 of the first tubular member 110 via the lifting device.

In some embodiments, the process for connecting the conduit protection apparatus 2 to the offshore structure can include securing the conduit end termination 4 within the bore 137 defined by the second tubular member 120 by positioning the plurality of second bolts 160 at the latched position such that the first end 161 of each second bolt 160 can be disposed within the groove 5 or a corresponding groove 5 defined by the conduit end termination 4.

The process can include moving the second tubular member 120 to the second position relative to the first tubular member 110 such that the plurality of second bolts 160 are moved from the latched position to the unlatched position while the plurality of first bolts 150 remains in the first locked position. Said another way, the second tubular member 120 can be moved to the second position relative to the first tubular member 110 while the first end 151 of each first bolt 150 remains disposed within the first groove 126 or a corresponding first groove 126 defined by the second tubular member 120.

The process can include moving the second tubular member 120 to the first position relative to the first tubular member 110. The process can include moving the second tubular member 120 to the first position relative to the first tubular member 110 while the plurality of first bolts 150 remains at the first locked position. Said another way, while the first end 151 of each first bolt 150 remains disposed within the first groove 126 defined by the second tubular member 120. The process can include moving the second tubular member 120 to the first position relative to the first tubular member 110 while the plurality of first bolts 150 remains at the first locked position, and while the plurality of second bolts 160 remains in the unlatched position. The process for connecting the conduit protection apparatus 2 to the offshore structure can include moving the conduit end termination 4 and the conduit 3 into a final position.

The process for connecting the conduit protection apparatus 2 to the offshore structure can include positioning the second tubular member 120 at the third position relative to the first tubular member 110 and positioning the plurality of first bolts 150 in the second locked position such that the first end 151 of each first bolt 150 is disposed within the second groove 127 or a corresponding second groove 127 defined by the second tubular member 120. In some embodiments, the process can include moving the second tubular member 120 from the third position to the first position relative to the first tubular member 110 while simultaneously moving the plurality of first bolts 150 from the second locked position to the first locked position.

The process for connecting the conduit protection apparatus 2 to the offshore structure can include disposing the conduit end termination 4 on an end 7 of the conduit 3. In some embodiments, the process can include disposing the conduit 3 through the bore 137 defined by the second tubular member 120 and through a bore 9 defined by the conduit protection apparatus 2 and connecting or otherwise disposing the conduit end termination 4 on to the end 7 of the conduit 3.

In some embodiments of the process, the conduit protection apparatus 2 can be a bend stiffener, the conduit 3 can be an umbilical or a riser, and the first tubular member 110 can be connected to an I-tube or a J-tube of the offshore structure. In some embodiments of the process, the offshore structure can be an offshore floating structure.

A process for disconnecting a conduit protection apparatus 2 from an offshore structure when the conduit protection apparatus 2 is connected to the offshore structure via the connector assembly 100 and the second tubular member 120 is at the first position relative to the first tubular member 110 and the plurality of first bolts 150 is disposed at the first locked position can include moving the plurality of first bolts 150 from the first locked position to the unlocked position. In some embodiments, the process can include moving the second tubular 120 member to a disconnected position relative to the first tubular member 110. In some embodiments, the process can include moving the second tubular member 120 to the disconnected position relative to the first tubular member 110 via the lifting device.

The process can include the positioning the conduit end termination 4 within the bore 137 defined by the second tubular member 120, disposing the plurality of second bolts 160 in the latched position such that the first end 161 of each second bolt 160 is disposed within the groove 5 defined by the conduit end termination 4. The process of positioning the plurality of first bolts 150 can include turning each nut 172 such that each nut 172 reacts against a corresponding housing 171 of each first bolt actuator 170 to position the corresponding first bolt 150 in the unlocked position. In other embodiments, not shown each first bolt actuator 170 can be configured with a linear actuator, for example a hydraulic, electrical, or pneumatic actuator that can move or position each first bolt 150 in the unlocked position.

The present disclosure further relates to any one or more of the following numbered embodiments:

A1. A connector assembly, configured such that a first tubular member that defines a bore therethrough from a first end to a second end thereof, wherein a sidewall of the first tubular member defines a plurality of apertures therethrough; a second tubular member that defines a bore therethrough from a first end to a second end thereof, wherein: the second end of the second tubular member is configured to be attached to a conduit protection apparatus, a sidewall of the second tubular member defines a plurality of apertures therethrough, and the second tubular member defines one or more first grooves about an outer surface thereof; a plurality of first bolts, each at least partially disposed through a corresponding one of the plurality of apertures defined by the sidewall of the first tubular member and movable between an unlocked position and a first locked position; a plurality of second bolts, each at least partially disposed through a corresponding one of the plurality apertures defined by the sidewall of the second tubular member and movable between an unlatched position and a latched position; a release ring disposed about an exterior surface of the second tubular member comprising a first end and a second end; and a plurality of release keys, each configured to engage with the release ring and with a corresponding second bolt of the plurality of second bolts wherein: the second tubular member is configured to be at least partially positioned within the bore defined by the first tubular member and move between a first position and a second position relative to the first tubular member, when the second tubular member is in the first position or the second position and the plurality of first bolts is in the first locked position, a first end of each first bolt in the plurality of first bolts is positioned within a corresponding one of the one or more first grooves defined by the second tubular member, when the second tubular member is in the second position, the plurality of second bolts is in the unlatched position, and when the second tubular member is in the first position or the second position, the first end of the release ring is configured to abut against the second end of the first tubular member.

A2. The connector assembly of paragraph A1, configured such that the second tubular member is movable between the first position and the second position while the first end of each first bolt in the plurality of first bolts remains disposed within the corresponding one of the one or more the first grooves defined by the second tubular member.

A3. The connector assembly of paragraph A1 or A2, configured such that the second tubular member defines one or more second grooves about the outer surface thereof, each first bolt is movable between the unlocked position, the first locked position, and a second locked position, and when the second tubular member is disposed within the bore defined by the first tubular member at a third position and the plurality of first bolts is in the second locked position, the first end of each first bolt in the plurality of first bolts is disposed within one of the one or more second grooves defined by the second tubular member.

A4. The connector assembly of any one of paragraphs A1 to A3, configured such that the one or more second grooves is located between the at least one first groove and the first end of the second tubular member.

A5. The connector assembly of any one of paragraphs A1 to A4, configured such that, when the second tubular member moves between the first position, the second position, and the third position, the plurality of first bolts moves between the first locked position and the second locked position without moving to the unlocked position.

A6. The connector assembly of any one of paragraphs A1 to A5, configured such that: the bore defined by the second tubular member is configured to receive a conduit end termination that defines one or more grooves about an outer surface thereof, and when the conduit end termination is disposed within the bore defined by the second tubular member, a first end of each second bolt in the plurality of second bolts is configured to be disposed within one of the one or more grooves defined by the conduit end termination.

A7. The connector assembly of any one of paragraphs A1 to A6, configured such that when the plurality of first bolts is in the unlocked position, the first end of each first bolt in the plurality of first bolts is located outside of the one or more first grooves defined by the second tubular member, and when the plurality of second bolts is in the unlatched position, the first end of each second bolt in the plurality of second bolts is located outside of the one of the one or more grooves defined by the conduit end termination.

A8. The connector assembly of any one of paragraphs A1 to A7, configured such that a plurality of first bolt actuators and a plurality of second bolt actuators, wherein: each first bolt actuator is configured to exert a radially inward force on a corresponding first bolt to push the corresponding first bolt toward a central axis of the connector assembly, and each second bolt actuator is configured to exert a radially inward force on a corresponding second bolt to push the corresponding second bolt toward the central axis of the connector assembly.

A9. The connector assembly of any one of paragraphs A1 to A8, configured such that each first bolt actuator comprises a housing, a spring, and a nut, the housing of each first bolt actuator is disposed on an exterior surface of the first tubular member and the housing of each first bolt actuator is configured to contain a corresponding first bolt of the plurality of first bolts within the corresponding one of the plurality of apertures defined by the sidewall of the first tubular member, the spring of each first bolt actuator is configured to be disposed between a corresponding housing of each first bolt actuator and a shoulder of a corresponding first bolt to apply the radially inward force on the corresponding first bolt, and a second end of each first bolt is configured to extend through an aperture defined by the housing of each first bolt actuator and threadingly engage with the nut of each first bolt actuator.

A10. The connector assembly of any one of paragraphs A1 to A9, configured such that each second bolt actuator comprises a housing, a spring, and a nut, the housing of each second bolt actuator is disposed on an exterior surface of the second tubular member and the housing is configured to contain a corresponding second bolt of the plurality of second bolts at least partially within the corresponding one of the plurality of apertures defined by the sidewall of the second tubular member, the spring each second bolt actuator is configured to be disposed between the housing of each second bolt actuator and a shoulder of a corresponding second bolt to apply the radially inward force on the corresponding second bolt, and a second end of each second bolt is configured to extend through an aperture defined by the housing of each second bolt actuator and threadingly engage with the nut of each second bolt actuator.

A11. The connector assembly of any one of paragraphs A1 to A10, configured such that each second bolt defines an aperture therethrough that defines an interior surface, each release key is at least partially insertable into the aperture defined by a corresponding second bolt, each release key has first surface that is parallel to an exterior surface of the second tubular member and a second surface that is angled relative to the first surface, and the second surface of each release key is configured to abut against the interior surface of the corresponding second bolt and move the corresponding second bolt from the latched position to the unlatched position when the second tubular member moves from the first position to the second position.

A12. The connector assembly of any one of paragraphs A1 to A11, configured such that the second tubular member defines a first cylindrical exterior surface toward the first end thereof and a second cylindrical exterior surface toward the second end thereof, and when the second tubular member is in the first position or the second position, the first cylindrical exterior surface and the second cylindrical exterior surface of the second tubular member abut against an interior surface of the first tubular member to constrain a rotational movement of the second tubular member relative to the first tubular member about an axis that is perpendicular to a central axis of the connector assembly.

A13. The connector assembly of any one of paragraphs A1 to A12, configured such that a diameter of the first cylindrical exterior surface defined by the second tubular member is no more than 5 millimeters less than a diameter of the internal surface of the first tubular member, and a diameter of the second cylindrical exterior surface of the second tubular member is no more than 5 millimeters less than a diameter of the internal surface of the first tubular member A14. The connector assembly of any one of paragraphs A1 to A13, configured such that: a first flange disposed on the first end of the first tubular member and a second flange disposed on the second end of the second tubular member, wherein: the first flange is configured to be attached to a corresponding flange disposed on a floating offshore structure, the conduit protection apparatus is a bend restrictor and the second flange is configured to be attached to a corresponding flange disposed on the bend restrictor, a conduit is disposed through a bore defined by the bend restrictor, a conduit end termination that defines one or more grooves on an outer surface thereof that is configured to be disposed on an end of the conduit and is configured to be disposed at least partially within the bore defined by the second tubular member, and each second bolt in the plurality of second bolts is configured to be disposed within a corresponding one of the one or more grooves defined by the conduit end termination to secure the conduit end termination to the second tubular member.

A15. The connector assembly of any one of paragraphs A1 to A14, configured such that, wherein the second end of the first tubular member comprises a frusto-conical interior surface and the first end of the second tubular member comprises a frusto-conical exterior surface.

B1. A process for connecting a second tubular member to a first tubular member of a connector assembly, that can include: disposing the second tubular member at least partially within a bore defined by the first tubular member at a first position, wherein: the first tubular member defines a bore therethrough from a first end to a second end thereof, a sidewall of the first tubular member defines a plurality of apertures therethrough, a first end of the first tubular member is configured to be attached to an offshore structure, the second tubular member defines one or more first grooves about an outer surface thereof, a sidewall of the second tubular member defines a plurality of apertures therethrough, the second tubular member defines a bore therethrough from a first end to a second end thereof, and a second end of the second tubular member is configured to be attached to a conduit protection apparatus, and the connector assembly further comprises: a plurality of first bolts, each at least partially disposed through a corresponding one of the plurality of apertures defined by the sidewall of the first tubular member and movable between an unlocked position and a first locked position, a plurality of second bolts, each at least partially disposed through a corresponding one of the plurality apertures defined by the sidewall of the second tubular member and movable between an unlatched position and a latched position, a release ring disposed about an exterior surface of the second tubular member, comprising a first end and a second end, wherein the first end of the release ring is configured to abut against the second end of the first tubular ember, and a plurality of release keys, each configured to engage with the release ring and with a corresponding second bolt of the plurality of second; and positioning the plurality of first bolts in the first locked position such that a first end of each first bolt is disposed within a corresponding one of the one or more first grooves defined by the second tubular member.

B2. The process of paragraph B1 that can include moving the second tubular member to a second position relative to the first tubular member such that the plurality of second bolts are moved from the latched position to the unlatched position while the first end of each first bolt remains disposed within the corresponding one of the one or more first grooves defined by the second tubular member.

B3. The process of paragraph B1 or B2 that can include positioning the second tubular member at a third position relative to the first tubular member and positioning the plurality of first bolts in a second locked position such that the first end of each first bolt is disposed within a corresponding one of the one or more second grooves defined by the second tubular member, or positioning the second tubular member at the first position relative to the first tubular member while the plurality of second bolts remains in the unlatched position and the plurality of first bolts remains in the first locked position.

B4. The process of any one of paragraphs B1 to B3 that can include disposing a first end of the first tubular member on the offshore structure; disposing the conduit protection apparatus on a second end of the second tubular member; disposing a conduit through a bore defined by the second tubular member; disposing a conduit end termination on an end of the conduit and disposing the conduit end termination within the bore defined by the second tubular member; and moving the conduit end termination and the conduit into a final position.

C1. A connector assembly, comprising: a first tubular member comprising a first end configured to be attached to an offshore structure and a second end that defines a frusto-conical interior surface, wherein the first tubular member defines a plurality of apertures therethrough; a second tubular member comprising a first end that defines a frusto-conical exterior surface and a second end configured to be attached to a conduit protection apparatus, wherein: the second tubular member defines a first circumferential groove and a second circumferential groove about an outer surface thereof, a sidewall of the second tubular member defines a plurality of radial apertures therethrough, and the second circumferential groove is located between the first circumferential groove and the first end of the second tubular member; a plurality of first bolts, each at least partially disposed through a corresponding one of the plurality of apertures defined by the first tubular member and movable between an unlocked position, a first locked position, and a second locked position; a plurality of second bolts, each at least partially disposed through a corresponding one of the plurality of apertures defined by the sidewall of the second tubular member and movable between an unlatched position and a latched position; a release ring disposed about an exterior surface of the second tubular member, comprising a first end configured to abut against the second end of the first tubular member and a second end; a plurality of release keys, each configured to engage with the release ring and with a corresponding second bolt; a plurality of first bolt actuators; and a plurality of second bolt actuators, wherein: the second tubular member is configured to be at least partially positioned within a bore defined by the first tubular member at a first position, at a second position, and at a third position relative to the first tubular member, when the second tubular member is in the first position or the second position and the plurality of first bolts is in the first locked position, a first end of each first bolt is disposed within the first circumferential groove defined by the second tubular member, when the second tubular member is in the second position, the plurality of second bolts is in the unlatched position, when the second tubular member is in the third position and the plurality of first bolts is in the second locked position, a first end of each first bolt is disposed within the second circumferential groove defined by the second tubular member, the second tubular member is movable between the first position and the second position while the first end of each first bolt remains disposed within the first circumferential groove defined by the second tubular member, when the second tubular member moves between the first position, the second position, and third position, the plurality of first bolts moves between the first locked position and the second locked position without moving to the unlocked position, each first bolt actuator in the plurality of first bolt actuators is configured to exert a radially inward force on a corresponding first bolt to push the corresponding first bolt toward a central axis of the connector assembly, and each second bolt actuator in the plurality of second bolt actuators is configured to exert a radially inward force on a corresponding second bolt to push the corresponding second bolt toward the central axis of the connector assembly.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim can be not defined above, it should be given the broadest definition persons in the pertinent art have given that term as reflected in at least one printed publication or issued patent. Furthermore, all patents, test procedures, and other documents cited in this application are fully incorporated by reference to the extent such disclosure can be not inconsistent with this application and for all jurisdictions in which such incorporation can be permitted.

While certain preferred embodiments of the present invention have been illustrated and described in detail above, it can be apparent that modifications and adaptations thereof will occur to those having ordinary skill in the art. It should be, therefore, expressly understood that such modifications and adaptations may be devised without departing from the basic scope thereof, and the scope thereof can be determined by the claims that follow.

What is claimed is:

1. A connector assembly, comprising:

a first tubular member that defines a bore therethrough from a first end to a second end thereof, wherein a sidewall of the first tubular member defines a plurality of apertures therethrough;

a second tubular member that defines a bore therethrough from a first end to a second end thereof, wherein:

the second end of the second tubular member is configured to be attached to a conduit protection apparatus, a sidewall of the second tubular member defines a plurality of apertures therethrough, and the second tubular member defines one or more first grooves about an outer surface thereof;

a plurality of first bolts, each at least partially disposed through a corresponding one of the plurality of apertures defined by the sidewall of the first tubular member and movable between an unlocked position and a first locked position;

a plurality of second bolts, each at least partially disposed through a corresponding one of the plurality apertures defined by the sidewall of the second tubular member and movable between an unlatched position and a latched position;

a release ring disposed about an exterior surface of the second tubular member comprising a first end and a second end; and a plurality of release keys, each configured to engage with the release ring and with a corresponding second bolt of the plurality of second bolts wherein:

the second tubular member is configured to be at least partially positioned within the bore defined by the first tubular member and move between a first position and a second position relative to the first tubular member, when the second tubular member is in the first position or the second position and the plurality of first bolts is in the first locked position, a first end of each first bolt in the plurality of first bolts is positioned within a corresponding one of the one or more first grooves defined by the second tubular member, when the second tubular member is in the second position, the plurality of second bolts is in the unlatched position, and when the second tubular member is in the first position or the second position, the first end of the release ring is configured to abut against the second end of the first tubular member.

2. The connector assembly of claim 1, wherein the second tubular member is movable between the first position and the second position while the first end of each first bolt in the plurality of first bolts remains disposed within the corresponding one of the one or more the first grooves defined by the second tubular member.

3. The connector assembly of claim 2, wherein:

the second tubular member defines one or more second grooves about the outer surface thereof, each first bolt is movable between the unlocked position, the first locked position, and a second locked position, and when the second tubular member is disposed within the bore defined by the first tubular member at a third position and the plurality of first bolts is in the second locked position, the first end of each first bolt in the plurality of first bolts is disposed within one of the one or more second grooves defined by the second tubular member.

4. The connector assembly of claim 3, wherein the one or more second grooves is located between the at least one first groove and the first end of the second tubular member.

5. The connector assembly of claim 4, wherein, when the second tubular member moves between the first position, the second position, and the third position, the plurality of first bolts moves between the first locked position and the second locked position without moving to the unlocked position.

6. The connector assembly of claim 1, wherein:

the bore defined by the second tubular member is configured to receive a conduit end termination that defines one or more grooves about an outer surface thereof, and when the conduit end termination is disposed within the bore defined by the second tubular member, a first end of each second bolt in the plurality of second bolts is configured to be disposed within one of the one or more grooves defined by the conduit end termination.

7. The connector assembly of claim 6, wherein:

when the plurality of first bolts is in the unlocked position, the first end of each first bolt in the plurality of first bolts is located outside of the one or more first grooves defined by the second tubular member, and when the plurality of second bolts is in the unlatched position, the first end of each second bolt in the plurality of second bolts is located outside of the one of the one or more grooves defined by the conduit end termination.

8. The connector assembly of claim 1, further comprising a plurality of first bolt actuators and a plurality of second bolt actuators, wherein:

each first bolt actuator is configured to exert a radially inward force on a corresponding first bolt to push the corresponding first bolt toward a central axis of the connector assembly, and each second bolt actuator is configured to exert a radially inward force on a corresponding second bolt to push the corresponding second bolt toward the central axis of the connector assembly.

9. The connector assembly of claim 8, wherein:

each first bolt actuator comprises a housing, a spring, and a nut, the housing of each first bolt actuator is disposed on an exterior surface of the first tubular member and the housing of each first bolt actuator is configured to contain a corresponding first bolt of the plurality of first bolts within the corresponding one of the plurality of apertures defined by the sidewall of the first tubular member, the spring of each first bolt actuator is configured to be disposed between a corresponding housing of each first bolt actuator and a shoulder of a corresponding first bolt to apply the radially inward force on the corresponding first bolt, and a second end of each first bolt is configured to extend through an aperture defined by the housing of each first bolt actuator and threadingly engage with the nut of each first bolt actuator.

10. The connector assembly of claim 9, wherein:

each second bolt actuator comprises a housing, a spring, and a nut, the housing of each second bolt actuator is disposed on an exterior surface of the second tubular member and the housing is configured to contain a corresponding second bolt of the plurality of second bolts at least partially within the corresponding one of the plurality of apertures defined by the sidewall of the second tubular member, the spring each second bolt actuator is configured to be disposed between the housing of each second bolt actuator and a shoulder of a corresponding second bolt to apply the radially inward force on the corresponding second bolt, and a second end of each second bolt is configured to extend through an aperture defined by the housing of each second bolt actuator and threadingly engage with the nut of each second bolt actuator.

11. The connector assembly of claim 1, wherein:

each second bolt defines an aperture therethrough that defines an interior surface, each release key is at least partially insertable into the aperture defined by a corresponding second bolt, each release key has first surface that is parallel to an exterior surface of the second tubular member and a second surface that is angled relative to the first surface, and the second surface of each release key is configured to abut against the interior surface of the corresponding second bolt and move the corresponding second bolt from the latched position to the unlatched position when the second tubular member moves from the first position to the second position.

12. The connector assembly of claim 1, wherein:

the second tubular member defines a first cylindrical exterior surface toward the first end thereof and a second cylindrical exterior surface toward the second end thereof, and when the second tubular member is in the first position or the second position, the first cylindrical exterior surface and the second cylindrical exterior surface of the second tubular member abut against an interior surface of the first tubular member to constrain a rotational movement of the second tubular member relative to the first tubular member about an axis that is perpendicular to a central axis of the connector assembly.

13. The connector assembly of claim 12, wherein:

a diameter of the first cylindrical exterior surface defined by the second tubular member is no more than 5 millimeters less than a diameter of the internal surface of the first tubular member, and a diameter of the second cylindrical exterior surface of the second tubular member is no more than 5 millimeters less than a diameter of the internal surface of the first tubular member.

14. The connector assembly of claim 1, further comprising:

a first flange disposed on the first end of the first tubular member and a second flange disposed on the second end of the second tubular member, wherein:

the first flange is configured to be attached to a corresponding flange disposed on a floating offshore structure, the conduit protection apparatus is a bend restrictor and the second flange is configured to be attached to a corresponding flange disposed on the bend restrictor, a conduit is disposed through a bore defined by the bend restrictor, a conduit end termination that defines one or more grooves on an outer surface thereof that is configured to be disposed on an end of the conduit and is configured to be disposed at least partially within the bore defined by the second tubular member, and each second bolt in the plurality of second bolts is configured to be disposed within a corresponding one of the one or more grooves defined by the conduit end termination to secure the conduit end termination to the second tubular member.

15. The connector assembly of claim 1, wherein the second end of the first tubular member comprises a frusto-conical interior surface and the first end of the second tubular member comprises a frusto-conical exterior surface.

16. A process for connecting a second tubular member to a first tubular member of a connector assembly, comprising:

positioning the second tubular member at least partially within a bore defined by the first tubular member at a first position, wherein:

the first tubular member defines a bore therethrough from a first end to a second end thereof, a sidewall of the first tubular member defines a plurality of apertures therethrough, a first end of the first tubular member is configured to be attached to an offshore structure, the second tubular member defines one or more first grooves about an outer surface thereof, a sidewall of the second tubular member defines a plurality of apertures therethrough, the second tubular member defines a bore therethrough from a first end to a second end thereof, and a second end of the second tubular member is configured to be attached to a conduit protection apparatus, and the connector assembly further comprises:

a plurality of first bolts, each at least partially disposed through a corresponding one of the plurality of apertures defined by the sidewall of the first tubular member and movable between an unlocked position and a first locked position, a plurality of second bolts, each at least partially disposed through a corresponding one of the plurality apertures defined by the sidewall of the second tubular member and movable between an unlatched position and a latched position, a release ring disposed about an exterior surface of the second tubular member, comprising a first end and a second end, wherein the first end of the release ring is configured to abut against the second end of the first tubular member, and a plurality of release keys, each configured to engage with the release ring and with a corresponding second bolt in the plurality of second bolts; and positioning the plurality of first bolts in the first locked position such that a first end of each first bolt is disposed within a corresponding one of the one or more first grooves defined by the second tubular member.

17. The process of claim 16, comprising:

moving the second tubular member to a second position relative to the first tubular member such that the plurality of second bolts are moved from the latched position to the unlatched position while the first end of each first bolt remains disposed within the corresponding one of the one or more first grooves defined by the second tubular member.

18. The process of claim 17, comprising:

positioning the second tubular member at a third position relative to the first tubular member and positioning the plurality of first bolts in a second locked position such that the first end of each first bolt is disposed within a corresponding one of the one or more second grooves defined by the second tubular member, or positioning the second tubular member at the first position relative to the first tubular member while the plurality of second bolts remains in the unlatched position and the plurality of first bolts remains in the first locked position.

19. The process of claim 18, further comprising:

disposing a first end of the first tubular member on the offshore structure;

disposing the conduit protection apparatus on a second end of the second tubular member;

disposing a conduit through a bore defined by the second tubular member;

disposing a conduit end termination on an end of the conduit and disposing the conduit end termination within the bore defined by the second tubular member; and moving the conduit end termination and the conduit into a final position.

20. A connector assembly, comprising:

a first tubular member comprising a first end configured to be attached to an offshore structure and a second end that defines a frusto-conical interior surface, wherein a sidewall of the first tubular member defines a plurality of apertures therethrough;

a second tubular member comprising a first end that defines a frusto-conical exterior surface and a second end configured to be attached to a conduit protection apparatus, wherein:

the second tubular member defines a first circumferential groove and a second circumferential groove about an outer surface thereof, a sidewall of the second tubular member defines a plurality of radial apertures therethrough, and the second circumferential groove is located between the first circumferential groove and the first end of the second tubular member;

a plurality of first bolts, each at least partially disposed through a corresponding one of the plurality of apertures defined by the sidewall of the first tubular member and movable between an unlocked position, a first locked position, and a second locked position;

a plurality of second bolts, each at least partially disposed through a corresponding one of the plurality of apertures defined by the sidewall of the second tubular member and movable between an unlatched position and a latched position;

a release ring disposed about an exterior surface of the second tubular member, comprising a first end configured to abut against the second end of the first tubular member and a second end;

a plurality of release keys, each configured to engage with the release ring and with a corresponding second bolt;

a plurality of first bolt actuators; and a plurality of second bolt actuators, wherein:

the second tubular member is configured to be at least partially positioned within a bore defined by the first tubular member at a first position, at a second position, and at a third position relative to the first tubular member, when the second tubular member is in the first position or the second position and the plurality of first bolts is in the first locked position, a first end of each first bolt is disposed within the first circumferential groove defined by the second tubular member, when the second tubular member is in the second position, the plurality of second bolts is in the unlatched position, when the second tubular member is in the third position and the plurality of first bolts is in the second locked position, the first end of each first bolt is disposed within the second circumferential groove defined by the second tubular member, the second tubular member is movable between the first position and the second position while the first end of each first bolt remains disposed within the first circumferential groove defined by the second tubular member, when the second tubular member moves between the first position, the second position, and the third position, the plurality of first bolts moves between the first locked position and the second locked position without moving to the unlocked position, each first bolt actuator in the plurality of first bolt actuators is configured to exert a radially inward force on a corresponding first bolt to push the corresponding first bolt toward a central axis of the connector assembly, and each second bolt actuator in the plurality of second bolt actuators is configured to exert a radially inward force on a corresponding second bolt to push the corresponding second bolt toward the central axis of the connector assembly.

* * * * *